United States Patent
Givon (10) Patent No.: US 7,429,997 B2
(45) Date of Patent: Sep. 30, 2008

(54) SYSTEM AND METHOD FOR SPHERICAL STEREOSCOPIC PHOTOGRAPHING

(75) Inventor: Dor Givon, Rishon Lezion (IL)

(73) Assignee: Micoy Corporation, Des Moines, IA (US)

( * ) Notice: Subject to any disclaimer, the term of this patent is extended or adjusted under 35 U.S.C. 154(b) by 700 days.

(21) Appl. No.: 10/416,533

(22) PCT Filed: Nov. 28, 2001

(86) PCT No.: PCT/IL01/01093

§ 371 (c)(1),
(2), (4) Date: May 27, 2003

(87) PCT Pub. No.: WO02/44808

PCT Pub. Date: Jun. 6, 2002

(65) Prior Publication Data

US 2004/0066449 A1 Apr. 8, 2004

(30) Foreign Application Priority Data

Nov. 29, 2000 (IL) .................................. 139995

(51) Int. Cl.
*H04N 13/02* (2006.01)
*G02B 13/06* (2006.01)
(52) U.S. Cl. .............................. 348/46; 348/38; 348/48; 359/725
(58) Field of Classification Search ................. 396/324, 396/325, 332; 348/38, 48, 36; 352/69, 70, 352/57; 359/725
See application file for complete search history.

(56) References Cited

U.S. PATENT DOCUMENTS 3,187,339 A 6/1965 Wallace (Continued)

FOREIGN PATENT DOCUMENTS

DE 10030196 1/2002

(Continued)

OTHER PUBLICATIONS

"International Search Report for Application No. -PCT/US2006/012446", (Aug. 2006).

(Continued)

*Primary Examiner*—Gims S. Philippe
*Assistant Examiner*—Erick Rekstad
(74) *Attorney, Agent, or Firm*—Charles A. Lemaire; Lemaire Patent Law Firm, P.L.L.C.

(57) ABSTRACT

The present invention provides a novel imaging system for obtaining full stereoscopic spherical images of the visual environment surrounding a viewer, 360 degree both horizontally and vertically. Displaying the images obtained by the present system, by means suitable for stereoscopic displaying, gives the viewers the ability to look everywhere around them, as well as up and down, while having stereoscopic depth perception of the images displayed images. The system according to the present invention comprises an array of cameras, wherein the lenses of said cameras are situated on a curved surface, pointing out from common centers of said curved surface. The captured images of said system are arranged and processed to create sets of stereoscopic image pairs, wherein one image of each pair is designated for the observer right eye and the second image to his left eye, thus creating a three dimensional perception.

3 Claims, 7 Drawing Sheets

U.S. PATENT DOCUMENTS

| | | | |
|---|---|---|---|
| 3,357,770 | A | 12/1967 | Wallace |
| 3,953,869 | A | 4/1976 | Wah Lo et al. |
| 4,063,265 | A | 12/1977 | Wah Lo et al. |
| 4,214,821 | A | 7/1980 | Termes |
| 4,475,798 | A | 10/1984 | Smith et al. |
| 4,525,038 | A * | 6/1985 | Muller ........................ 359/753 |
| 4,868,682 | A | 9/1989 | Shimizu et al. ............... 386/96 |
| 5,023,725 | A | 6/1991 | McCutchen |
| 5,130,794 | A * | 7/1992 | Ritchey ........................ 348/39 |
| 5,562,572 | A | 10/1996 | Carmein |
| 5,650,813 | A | 7/1997 | Gilblom et al. |
| 5,657,073 | A * | 8/1997 | Henley ......................... 348/38 |
| 5,668,595 | A | 9/1997 | Katayama et al. |
| 5,721,585 | A | 2/1998 | Keast et al. |
| 5,946,077 | A | 8/1999 | Nemirovskiy |
| 5,973,726 | A | 10/1999 | Iijima et al. |
| 5,980,256 | A | 11/1999 | Carmein |
| 6,002,430 | A | 12/1999 | MacCall et al. |
| 6,023,588 | A | 2/2000 | Ray et al. |
| 6,031,540 | A | 2/2000 | Golin et al. |
| 6,034,716 | A | 3/2000 | Whiting et al. |
| 6,075,905 | A | 6/2000 | Herman et al. |
| 6,112,033 | A | 8/2000 | Yano et al. |
| 6,141,034 | A | 10/2000 | McCutchen |
| 6,169,858 | B1 | 1/2001 | Ray |
| 6,236,748 | B1 | 5/2001 | Iijima et al. |
| 6,243,103 | B1 | 6/2001 | Takiguchi et al. |
| 6,320,584 | B1 | 11/2001 | Golin et al. |
| 6,323,858 | B1 | 11/2001 | Gilbert et al. |
| 6,337,683 | B1 | 1/2002 | Gilbert et al. |
| 6,469,710 | B1 | 10/2002 | Shum et al. |
| 6,522,325 | B1 * | 2/2003 | Sorokin et al. ............... 345/427 |
| 6,559,846 | B1 | 5/2003 | Uyttendaele et al. |
| 6,639,596 | B1 | 10/2003 | Shum et al. |
| 6,654,019 | B2 | 11/2003 | Gilbert et al. |
| 6,665,003 | B1 * | 12/2003 | Peleg et al. .................... 348/36 |
| 6,683,608 | B2 | 1/2004 | Golin et al. |
| 6,947,059 | B2 * | 9/2005 | Pierce et al. ................ 345/629 |
| 7,015,954 | B1 * | 3/2006 | Foote et al. .............. 348/218.1 |
| 2005/0141089 | A1 | 6/2005 | Grover |
| 2006/0227417 | A1 | 10/2006 | Grover |
| 2006/0256113 | A1 | 11/2006 | Grover et al. |

FOREIGN PATENT DOCUMENTS

| | | |
|---|---|---|
| DE | 10030196 A1 | 1/2002 |
| JP | 07-140569 | 6/1995 |
| JP | 07-140569 A | 6/1995 |
| WO | WO-9621197 A1 | 7/1996 |
| WO | WO-9917543 | 4/1999 |
| WO | WO-2005067318 A2 | 7/2005 |
| WO | WO-2005067318 A3 | 7/2005 |
| WO | WO-2006107934 A1 | 10/2006 |
| WO | WO-2006124638 A2 | 11/2006 |
| WO | WO-2006124640 A2 | 11/2006 |

OTHER PUBLICATIONS

"Globuscope Panoramic Camera (advertisement)", *Obtained on Mar. 30, 2000 from* http://www.everent.com/globus/, 2 pgs.

"Live Picture Reality Studio", *Obtained on Mar. 27, 2000 from* http://www.livepicture.com/products/studio/content/html, 1 pg.

Charles, Jeffrey R., "Polar Projection and X-Y Omnidirectional Images", *Obtained Mar. 30, 2000 from* http://www.versacorp.com/vlink/product/polxyimg.htm/, 3 pgs.

Charles, Jeffrey R., "Portable All-Sky Reflector with "Invisible" Axial Camera Support (U.S. Patent No. D312,263)", *Obtained from* http://www.versacorp.com/versalink_fld/jcarticle_fld/allsky.htm, Presented at the 1987 Riverside Telescope Makers Conference, and published in the 1988 RTMC Proceedings; last updated Dec. 11, 1997,(1987), 12 pgs.

Chen, Y. P., "Landscape Generation: A Changing Prospective", *ESD: The Electronic System Design Magazine, v18*, (Feb. 1988), pp. 44-48.

Pritch, Y., et al., "Automatic Disparity Control in Stereo Panoramas (OmniStereo)", *Omnidirectional Vision, Proceedings.*, IEEE Workshop on Jun. 12, 2000, 8 pgs.

\* cited by examiner

SYSTEM AND METHOD FOR SPHERICAL STEREOSCOPIC PHOTOGRAPHING

CROSS-REFERENCE TO RELATED APPLICATIONS

This application is a U.S. National Phase Application under 35 U.S.C. 371 of PCT International Application No. PCT/IL01/01093, which has an international filing date of Nov. 28, 2001, and which claims priority from Israel Patent Application No. IL 139995, filed Nov. 29, 2000.

BACKGROUND OF THE INVENTION

1. Field of the Invention

The present invention relates to stereoscopic photographing system. More specifically, the present invention relates to a photographing system and method for generating stereoscopic images of a full sphere surrounding a viewer 360 degrees both horizontally and vertically, or of a continuous part thereof, comprising a spherical array of lenses having non-parallel optical axes.

2. Discussion of the Related Art

Stereoscopic and panoramic photographing systems are known in the art. In conventional stereoscopic photographing, stereo pairs are taken by twin-cameras having parallel optical axes and a fixed distance between their aligned lenses. The pair of the obtained images can then be displayed by any of the known techniques for stereoscopic displaying and viewing. All of these techniques are based, in general, on the principle that the image taken by the right lens is displayed to the viewer's right eye and the image taken by the left lens is displayed to the viewer's left eye.

Panoramic photographing is conventionally done either by a very wide-angle lens, such as a "fish-eye" lens, or by "stitching" together slightly overlapping adjacent images to cover a wide, up to a fill circle, field of vision. Recently, the same techniques used for panoramic imaging are also exploited for obtaining spherical images. However, the panoramic or spherical images obtained by using said techniques are not stereoscopic, nor do they give to the viewer a perception of depth.

Moreover, the field of the so called "Virtual Reality" has gained high popularity in recent years. However, imaging systems for virtual reality, which are based on real images and not on computer generated (or other synthetically made) images, are still far from achieving images of a satisfactory quality. This is due mainly to the difficulties in obtaining real images that are full spherical as well as stereoscopic.

Accordingly, there is a need for an improved photographing system which will provide fully spherical, and fully stereoscopic real images.

The present invention is based on the finding that a stereoscopic image can be obtained by overlapping images taken by lenses having non-parallel optical axes, providing that said lenses' fields of view are overlapping to a great extent. This finding enables a full spherical stereoscopic photographing by a three dimensional array of cameras pointing out from a common center for covering the whole surroundings, both horizontally and vertically.

SUMMARY OF THE INVENTION

The present invention provides a novel imaging system for obtaining full stereoscopic spherical images of the visual environment surrounding a viewer, 360 degree both horizontally and vertically. Displaying the images obtained by the present system, by means suitable for stereoscopic displaying, gives the viewers the ability to look everywhere around them, as well as up and down, while having stereoscopic depth perception of the displayed images.

One aspect of the present invention is a photographing system for capturing a full stereoscopic spherical image, or a continuous part thereof, comprising a three dimensional array of cameras. The cameras are positioned at an equal distance from a common center and pointing out from said common center, in such a manner that all lenses are situated on a spherical surface. The collective field of vision captured by all of the lenses covers the whole visual scale surrounding said photographing system, or a continuous part thereof, and any point in said collective field of vision is captured by at least two of said lenses. In one embodiment of the present invention, the cameras are arranged in such a way that the field of vision of any of the lenses is overlapped to a great extent by the fields of view of the two adjacent lenses lying on said lens sides, with respect to horizontal axis, and only to a small extent by the fields of vision of adjacent lenses lying above or below said lens with respect to the horizontal axis. According to this embodiment, the collective field of vision comprises a collection of, fully circular, stereoscopic panoramic images wherein any point within each of said panoramic images is captured by at least two lenses.

In a second embodiment, the cameras are arranged in the specific configuration, wherein the field of vision of any of said lenses is overlapped to a great extent by the fields of vision of all adjacent lenses surrounding said lens and wherein said lenses are optionally equally distributed on the spherical surface. The image information captured by each of said cameras is stored separately. Preferably the present invention further comprises a marking means for marking the boundaries of any of the images captured by any of said lenses, or a set of predetermined points within the area of each of said images and a means for image processing for processing the image information captured by any of said cameras and for cropping out redundant data in order to enhance said image quality.

A second aspect of the present invention is a multi-lens camera apparatus for generating a full stereoscopic spherical imaging. The apparatus comprises a set of lenses distributed on a spherical surface and a means for recording and optionally storing the image information of each of the images captured by each of said lenses. The lenses are distributed on the spherical surface, wherein the collective field of vision captured by all of said lenses, covers the whole visual environment surrounding the camera apparatus, and any point in said collective field of vision is captured by at least two of said lenses.

A third aspect of the present invention is a process for capturing full or partial stereoscopic spherical image of a visual environment to be displayed to a viewer by means allowing for stereoscopic viewing. The process comprises arranging cameras in a three dimensional array, wherein the lenses of all said cameras are situated on a spherical surface and the optical axes of all said lenses meet at the center of said spherical sphere, wherein the collective field of vision captured by all said lenses covers the whole visual environment surrounding array of cameras, or a continuous part thereof, and wherein any point in said collective field of vision is captured by at least two of said lenses.

A fourth aspect of the present invention is a process for capturing and displaying a full stereoscopic spherical image of a visual environment, to be displayed to a viewer by a system having means for stereoscopic displaying and viewing. The process comprises: a) arranging a three dimensional array of lenses for capturing a collection of images, wherein the collective field of vision captured by all said lenses covers the whole visual environment surrounding said array of lenses, and wherein any point in said collective field of vision is captured by at least two of said lenses; b) receiving from said system for stereoscopic displaying and viewing, the coordinates of said viewer's field of vision; c) creating a stereoscopic image pair from said collection of images, said stereoscopic image pair covers said viewer's field of vision; d) displaying said stereoscopic image pair to said viewer by means of said system for stereoscopic displaying and viewing. The step of creating a stereoscopic image pair from said collection of images comprises the following sub-steps: a) projecting said viewer's field of vision onto said collection of images; b) selecting from said collection of images a selected group of images overlapping at least partially said viewer's field of vision; c) dividing each of the images in said selected group of images into a left part and a right part by a line perpendicular to viewer's horizon and passing through image center to obtain a group of left image parts and a group of right image parts; d) selecting from said group of left image parts the parts overlapping said viewer's field of vision to obtain a group of selected left parts; e) merging said selected left parts into a uniform two-dimensional first image, said first image is the right image of said stereoscopic pair; f) selecting from said group of right image parts those parts overlapping said viewer's field of vision to obtain a group of selected right parts; g) merging said selected right parts into a uniform two-dimensional second image, said second image is the left image of said stereoscopic pair;

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENTS

The present invention provides a system and method for simultaneous capturing of a full spherical stereoscopic imaging or a continuous part thereof The method of the present invention for obtaining stereoscopic imaging is based on optical principles, and therefore can be adapted to any photographing technique. Although the preferred embodiment of the present invention comprises digital video cameras, the present system can be adapted as well to analog video cameras and to film cameras. The present system can generate still images or a time sequence of images for motion imaging.

The apparatus of the present invention comprises a three dimensional array of cameras, pointing out from common centers, wherein said cameras' principal optical axes meet at said centers. In the configuration thus formed, the lenses are situated on a curved surface, allowing for capturing images of the surrounding environment. According to the preferred embodiment of the present invention the cameras are positioned at an equal distance form a common center. However any curved surface or object (e.g. ellipse) can be used, applying the same principles of the present invention.

Figure 1A:
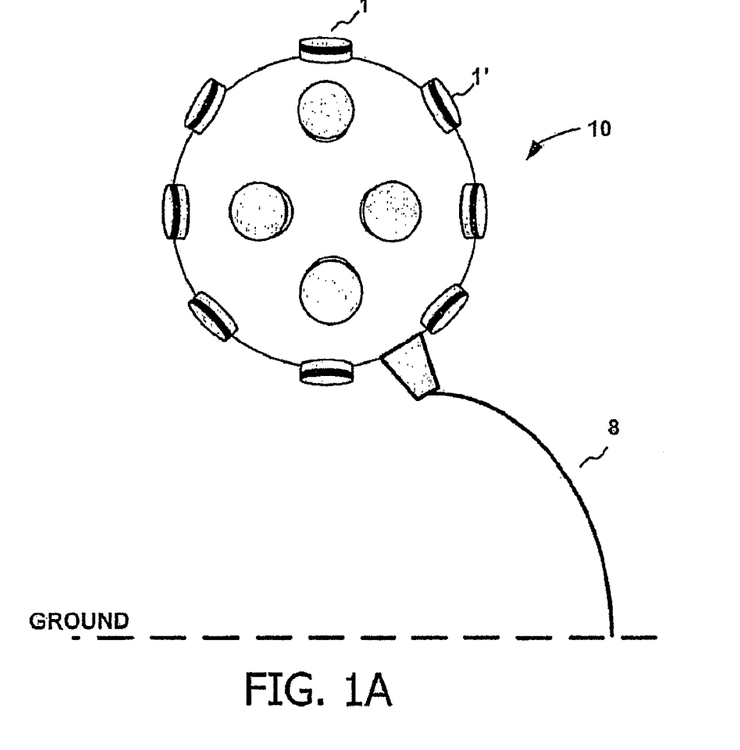
FIGS. 1A and 1B are two perspective views showing the configuration of the lenses on a sphere in accordance with the present invention.
Figure 1B:
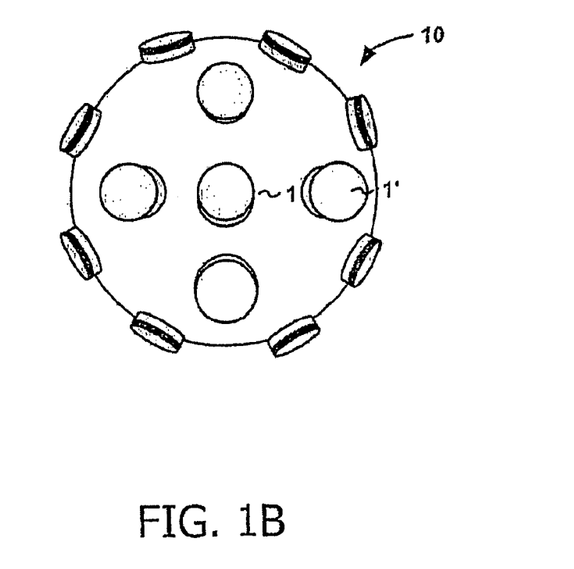
Figure 2:
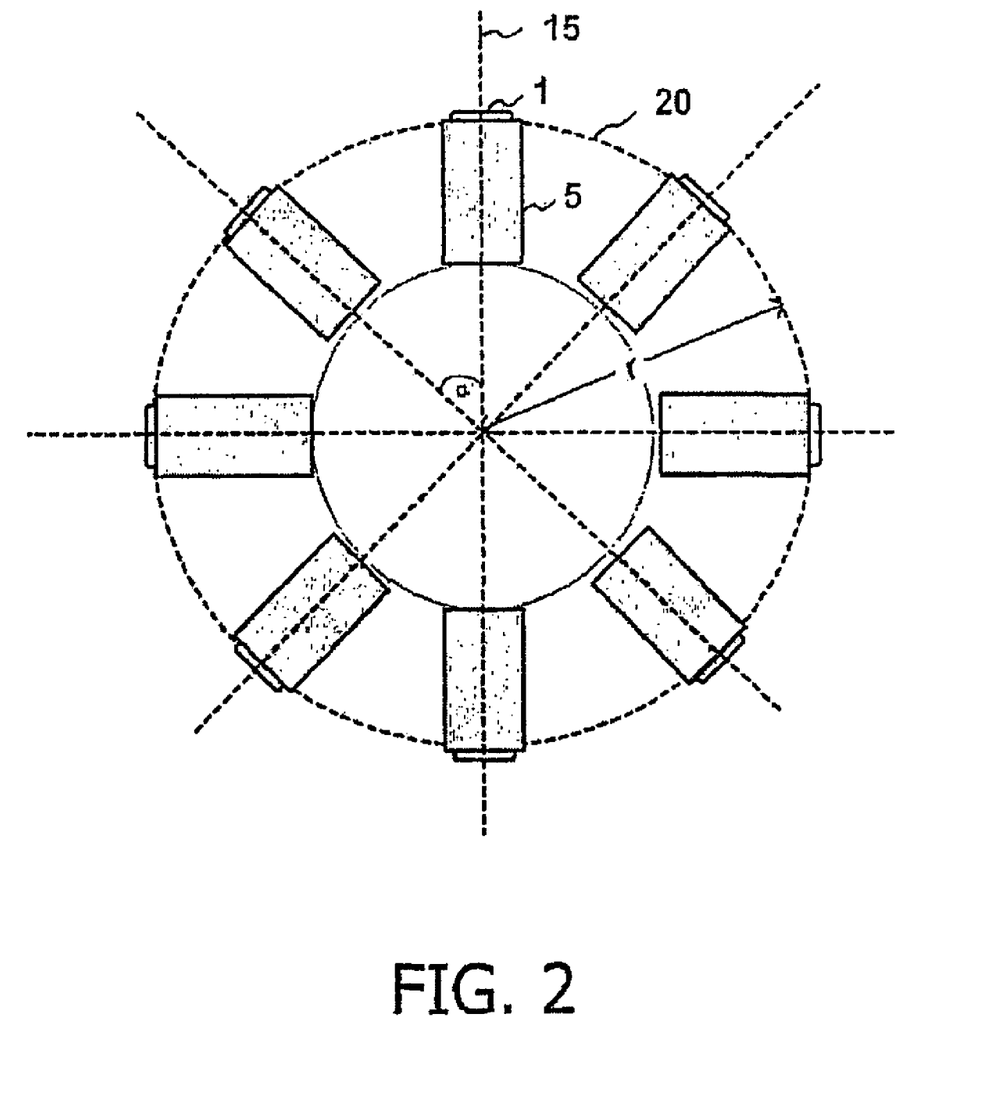
FIG. 2 is a horizontal cross section plane through the sphere center showing the cameras positions for generating one strap of a full stereoscopic panoramic view.

FIGS. 1A and 1B are two exterior perspective views showing the position of lenses (designated 1) on the so formed sphere. FIG. 2 is a cross section plane through the sphere center showing eight cameras (designated 5) equally spaced and radially pointing outward from the center, wherein said cameras' principal optical axis (designating 15) meet at the sphere's center. The collection of images captured by lenses 1 covers a fully spherical visual surrounding the camera system, 360 degrees both horizontally and vertically The actual installation of the cameras in order to form such fixed configuration can be obtained by various ways. For example, the cameras are mounted in designated gaps of a spherical object. Alternatively, the cameras can be mounted in a honeycomb net structure, etc.

The apparatus may be mounted on a supporting device 8 having means for enabling rotation and translation of the camera system. Such a support can be a tripod, having rolling means for allowing track-in/track-out and track-right/track-left translation and further having means for tilt and pan and for crane-up/crane-down. The apparatus further includes a stabilization system for preventing the system from vibrations and for keeping the cameras at their fixed positions relative to each other. The apparatus may further include internal robotics for allowing rotation, panning and tilting of the sphere, independently of support 8.

In the configuration described in FIGS. 1 and 2, the total number of lenses distributed on the sphere is eighteen. Using analogical terms of a globes terminology, the lenses arrangement can be described as follows: eight lenses are situated around the sphere equator for capturing a full 360 degree panoramic view, four lenses are situated around higher/lower latitude on each side of the equator for capturing the view above and below the horizon, and a lens at each pole to complete a full spherical view.

Preferably, the number of lenses is between 18 to 22. However, the number of cameras can be varied, depending on the desired quality of the image to be obtained, as will be explained below.

Figure 3:
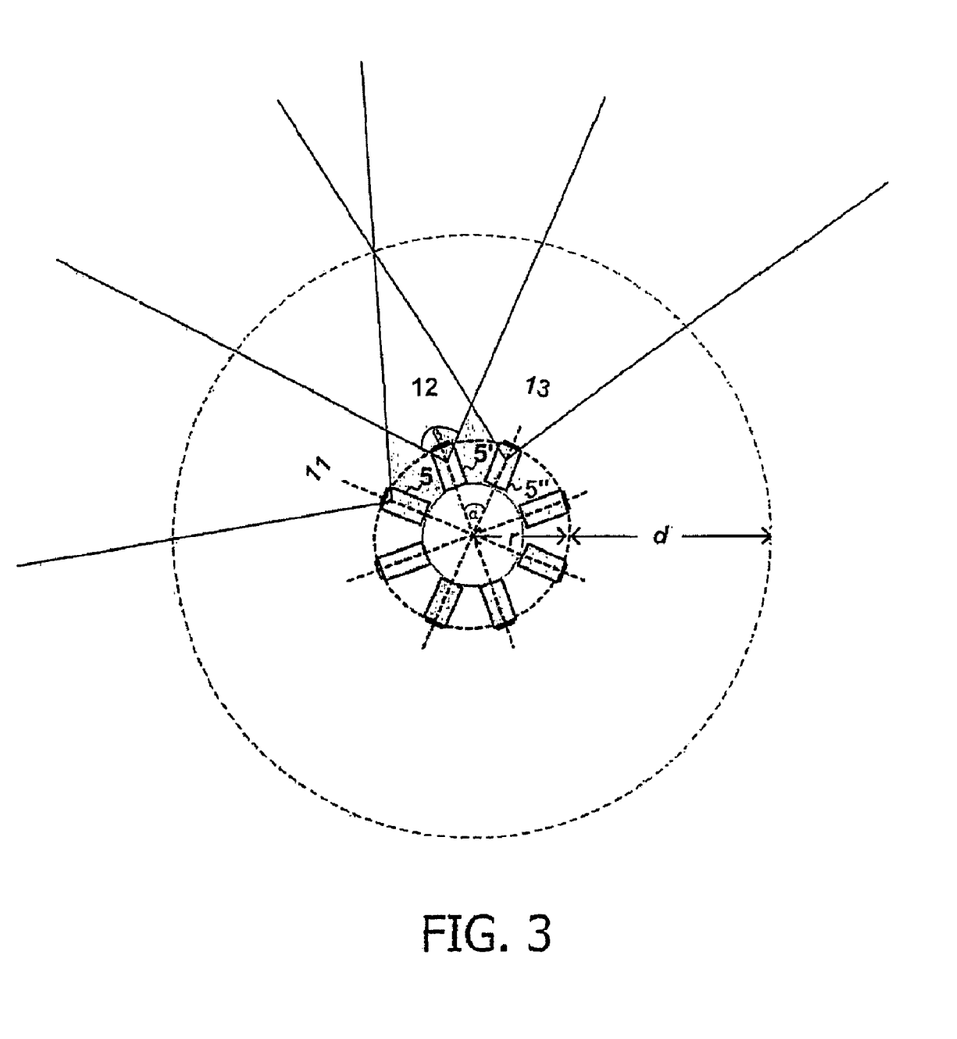
FIG. 3 schematically illustrates the overlapping between fields of view of adjacent cameras for generating a stereoscopic image.

FIG. 3 shows three adjacent cameras, 5, 5' and 5" and their corresponding fields of vision, 11, 12 and 13. A main idea of the present invention is to create a cameras' arrangement wherein any point in the collective field of vision is captured by at least two lenses of the cameras, thus providing stereoscopic sphere image. Thus, starting from a predetermined distance d from the sphere surface, any point is covered by the fields of vision of at least two lenses. As shown in FIG. 3, the left half of field 12 is overlapped by field 11 while its right half is overlapped by field 13, thus any point in field 12 is covered by at least one more lens. Distance d is a function of the angle α between the optical axes of adjacent lenses, the angle of coverage β of each lens and the sphere radius r.

Another factor to be considered is the desired quality of the captured images. The smaller is a lens angle of coverage (field of vision), the higher is the quality of the image obtained. The best image quality is obtained by the central portion of a lens coverage area and as the angle of coverage of a lens increases, so does the relative range of distorted borders. Therefore, the number of the required lenses of the apparatus is a function of the desired quality. For better image quality, a larger number of lenses, each having a smaller field of vision, should be used. Preferably, the angle of coverage of the lenses is in the range of 30 to 65 degrees (lenses of 35 to 70 mm).

Preferably, the lenses are identical, having the same angle of coverage and the same focal length, but it is also possible to have lenses of different angle of coverage wherein lenses of wider angles are used for areas not requiring high image quality.

According to the present invention, the cameras can be arranged in two basic configurations, resulting two basic distributions of lenses on the sphere. According to a first configuration, the sphere is divided into parallel straps, equivalent to circumferential latitude straps around the globe. The lenses in each such strap are arranged wherein any point in collective field of vision, captured by the lenses in that specific strap, is covered by at least two lenses, but there is only small overlapping between adjacent straps. As the length of the straps decrease towards the poles with increasing latitude, the number of lenses covering each strap decreases. Optionally Additional two lenses at each pole, give an upward and downward view in order to complete the fall spherical image. Such a configuration facilitates generating a spherical stereoscopic imaging as if conventional tilt and pan displaying systems are used. The assumption is that the viewer's horizon is substantially parallel with respect to ground, i.e. that his eyes are substantially at the same height with respect to ground. In the context of the present invention, the viewer's horizon is defined as the vector connecting the viewer eyes.

According to a second configuration, the cameras are configured with no preference to latitude or longitude coordinates. According to this "mosaic like" configuration, the field of vision of each lens overlaps to a great extent the fields of view of all adjacent lenses wherein the lenses are optionally equally distributed on the spherical surface. This configuration provides that any point in the collective field of vision is captured by lenses located around said point. The collection of images captured by this configuration facilitates stereoscopic perception from all viewing points, also when the viewer horizon is inclined with respect to ground.

The present invention is not limited to the type of the cameras used in the system. However, according to a preferred embodiment of the present invention, the cameras are digital video cameras having an electro-optical sensor such as a CCD sensor. The cameras can be selected from any commercially available digital video cameras According to this embodiment, the encoded digital image information, captured by each of the lenses, is transmitted via communication means to a remote storage device wherein each image is stored separately. The use of digital cameras allows for enhanced manipulation of the captured images and facilitates controlling the image quality prior to storage. However, it should be realized that when non-digital cameras are used, it is possible to digitize the stored images information for further manipulation and/or in order to convert it to a format compatible with the displaying and viewing technology known in the art.

According to the preferred embodiment of the present invention, the camera system further includes an internal computerized system comprising a suitable software for controlling the internal robotics responsible for the sphere motion and stabilization. The computerized system may further include a central processing unit, a storage device, a memory device and algorithms for processing the captured images prior to storage. Alternatively, the image processing can be done at a remote computer.

The digital image information captured by each camera is processed separately by the internal computer to remove distortion from each image separately. The images are cropped into pre-defined sections which are required for keeping an adequate overlap between adjacent images, wherein the image edges are eliminated for sparing the storage space of unnecessary information. The image enhancement may further include other known methods such as stretching and/or compressing certain parts of the image in order to correct distortions and to enhance the image quality. The image processing may also include processing methods as those employed by standard camera control units (CCU) in order to balance the image and achieve uniformity between adjacent images.

According to a preferred embodiment of the present invention, the camera system further includes a marking means for marking the borders of the lenses or a set of predetermined points in the rims and/or area of each of the lenses. The marking means can comprise one or more laser sources, such as a small diode laser, or other small radiation sources for generating beams of visible or invisible light. Said beams scan the borders of the lenses or a predetermined set of points in the area of the lenses to form a set of imprinted markers in the captured images.

Said set of imprinted markers is identified and used by the computerized system for accurate positioning of the images relative to each other. Although the relative positions of the cameras are fixed, small shifts might occur during operation. The markers system eliminates possible misalignment of the images due to such small shifts. Within each image, the marked borders or points are used to facilitate image processing in accordance with known image processing methods in order to remove distortion and to enhance the image quality.

It will be realized by those skilled in the art that the present invention is not limited to an array of commercially available cameras but can be implemented by a multi-lens camera apparatus designed in accordance with the spirit of the present invention. Such a multi-lens camera apparatus, comprising a set of lenses distributed on a spherical surface and corresponding sensor means for recording the image information captured by each of said lenses, can be built from basic camera elements. The sensor means can comprise a set of electro-optical sensors such as CCD chips, each corresponding to one lens, for receiving and converting the images captured by the lenses into encoded digital information In another configuration, the number of sensors can be smaller than the number of lenses, wherein along with appropriate optical elements, each sensor receives image information from more than one lens. For example, the sensor means can comprise only one electro-optical sensor wherein the camera apparatus includes suitable optical elements for projecting the images formed by each lens onto said one sensor. According to one embodiment of such a configuration, the sensor can be designed to be large enough to capture all images simultaneously. Alternatively, all images can be sequentially projected onto the same sensor area wherein a special mechanism controls a system of shutters for switching between lenses. (Similar mechanism can project the image on celluloid film mechanism).

Figure 4:
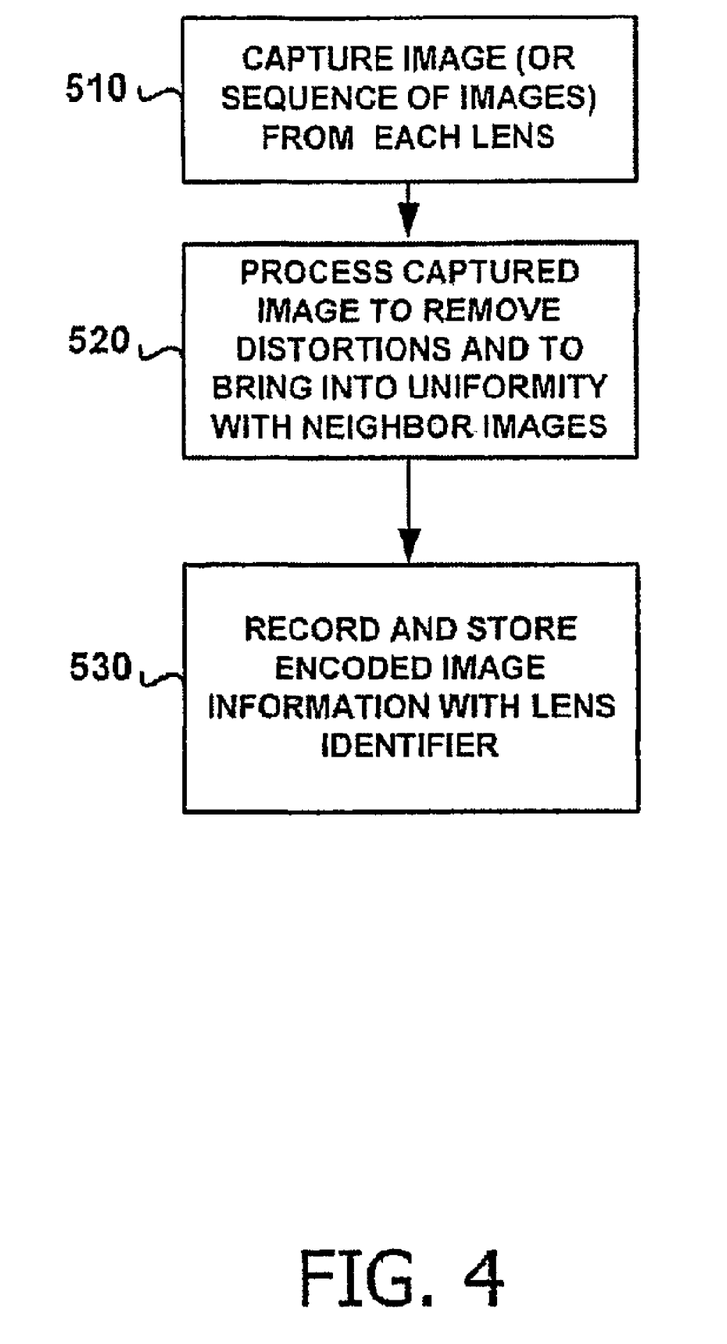
FIG. 4 is a flow chart describing the main steps for recording image information from each of the lenses comprising the system.
Figure 5:
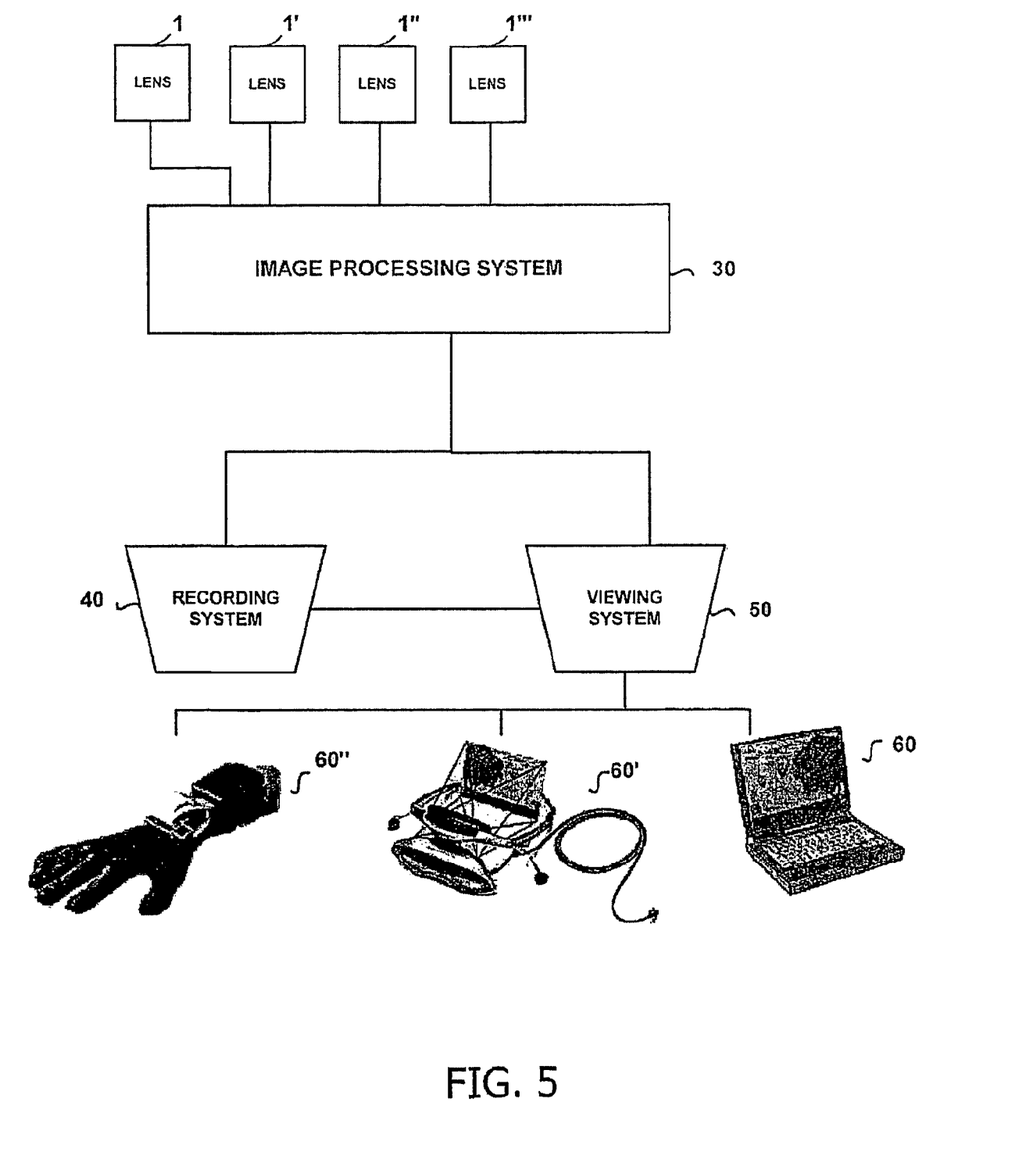
FIG. 5 is a block diagram of the present invention.

Reference is now made to FIG. 4 which, in conjunction with FIG. 5, describes the main steps of the image recording and displaying. The image (or sequence of images) information captured by each of lenses 1 in step 510, is optionally processed in step 520 by image processor 30 in order to enhance the image quality. In step 530 the images are recorded by recording system 40 and are optionally stored in a suitable storage medium. The image information (whether analog or digital, whether one image or sequence of images) from each of cameras 5 is recorded and stored separately with a lens indicator and a time indicator. The lens indicator includes information about the lens characteristics and position in terms of the sphere coordinates. Thus, a collection of recorded images is created wherein each image is stored separately and includes information about its relative position with respect to adjacent images.

The image processing in step 520 is optional. Depending on the optical characteristics of the lenses employed and on the desired quality of the image, various image processing techniques if any, may be employed. These techniques may vary from a simple cropping out of the image borders in order to completely remove distorted areas, to more sophisticated image processing methods such as stretching and/or compressing certain parts of the image in order to correct distortions and to enhance the image quality. The image processing may also include processing methods as those employed by standard camera control units (CCU) in order to balance the image and achieve uniformity between adjacent images.

The recorded images are displayed to a viewer via viewing system 50 employing known virtual reality equipment 60. Alternatively, viewing system 50 receives image information in real time, directly from the camera system.

It should be emphasized that according to the present invention the image processing is an optional step. As explained above, the image processing is performed on each of the images separately in order to maintain higher image quality and with no relation to the stereoscopic effect. The stereoscopic effect, according to the present invention, is based solely on optical principles and not requiring any image processing for that purpose, as explained down bellow.

Figure 6:
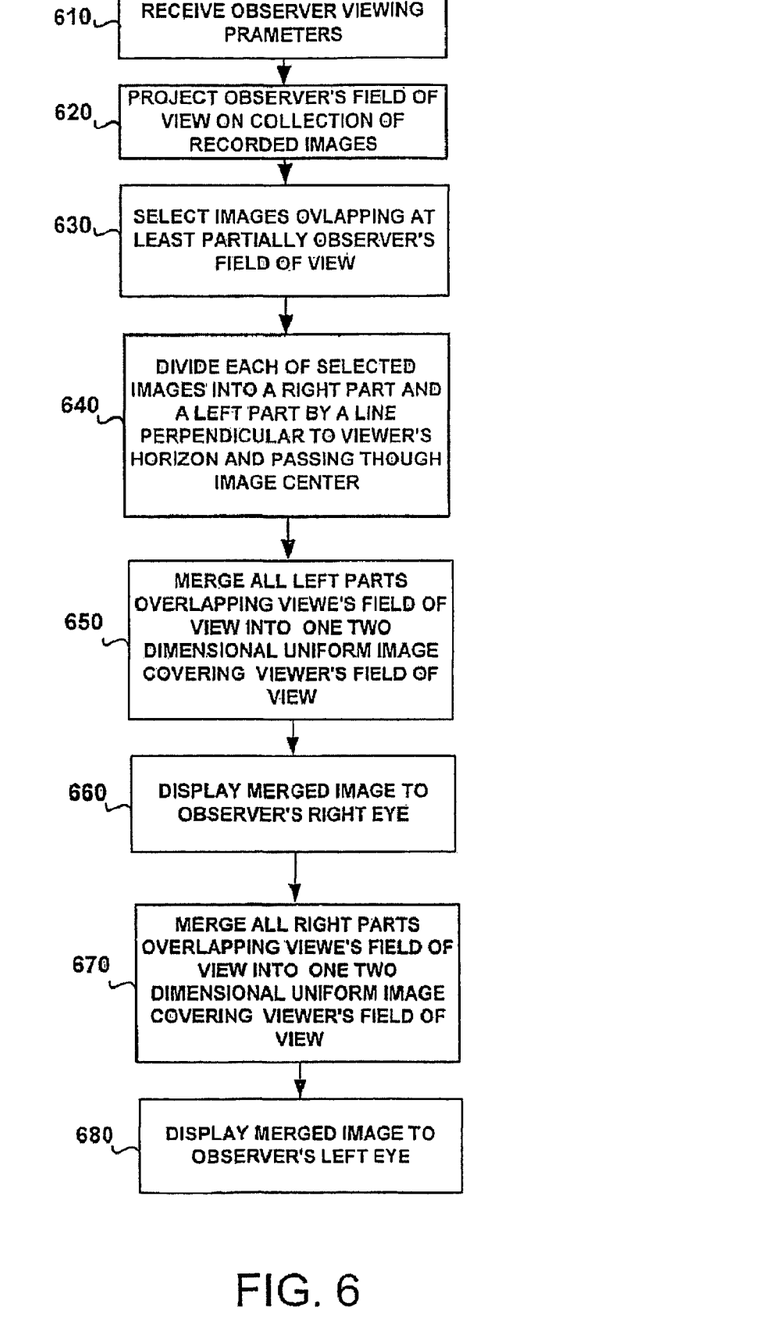
FIG. 6 is a flow chart describing the steps for generating a stereoscopic pair in accordance with the viewer' viewing parameters.

Reference is now made to FIG. 6 which is a flow chart describing the steps for generating a pair of stereoscopic images from the collection of recorded images in order to be displayed to the viewer according to his viewing parameters. The viewer's viewing parameters are detected by employing known means in the art of virtual reality, designated 60. Such means can be a headset having sensors to detect the viewer's head position or a virtual glove having a sensor to detect the hand position. For displaying on a flat screen, such as a computer screen, these parameters are taken from the pointing device (for example: a mouse or a joystick), programmed for this purpose.

In step 610, when a viewer selects a specific view, either by actually turning his head while wearing a virtual reality headset, or by a pointing device coupled to a computer device, the viewing parameters are detected and received by the displaying system. The viewer's viewing parameters include the viewer's viewing direction and viewer's horizon.

In step 620, in accordance with these parameters, the viewer's field of vision is determined in terms of the coordinates of the sphere surrounding the viewer and is projected into the collection of stored images. In step 630 all the images that overlap at least partially the viewer's field of vision are selected from the collection of recorded images.

Steps 640-680 illustrates the images organization algorithms based on the optical principles of the present invention for creating a pair of merged images wherein said pair of merged images creates the perception of three dimensional panoramic images. This algorithm can be alternatively applied for images captured by a single (or more) cameras wherein the images are taken from different angles and/or location of the same cameras. Such alternative is preferably applied for creating spherical stereoscopic still image.

First, a stereoscopic image pair is created from the group of selected images in the following way: Each of the selected images is divided into a left part and a right part according to the viewer's horizon by a line which is perpendicular the viewer horizon and is passing through the center of the image (step 640). In step 650 all the left parts generated in step 640 which are included in the viewer's field of vision are merged into a one uniform two dimensional image that matches the viewer's field of vision. The formed image, is the right image of the stereoscopic pair to be displayed to the viewer's right eye (step 660). Following the same lines, a left image is formed by merging together the right parts generated in step 640 (steps 670, 680 and 690).

Figure 7:
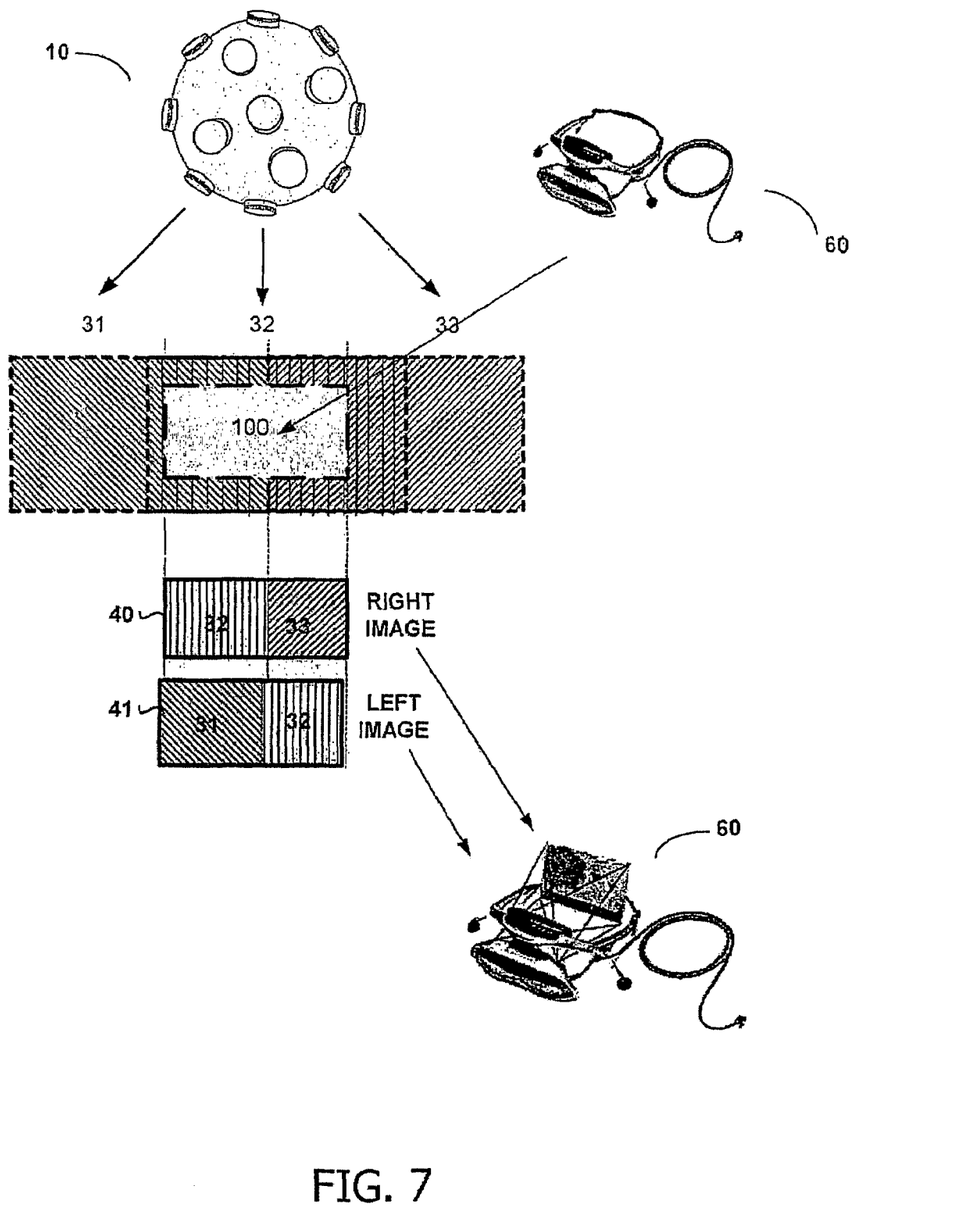
FIG. 7 pictorially describes an example of the process described in FIG. 6.

FIG. 7 pictorially describes one example of generating a stereoscopic pair according to the present invention. Frame 100 represents the viewer's field of vision as received by viewing system 60. The illustrated frame has rectangular shape, however the same stereoscopic principles can be applied to circular frames depending on the cameras technological capabilities. Frames 31, 32 and 33 represent three adjacent images, taken by the lenses (as viewed from underneath) of the camera system 10, which overlap viewer's field of vision 100. The middle frame 32 covers frame 100 completely while frames 31 and 33 partly overlap the left and the right sides of frame 100, respectively. In accordance with steps 640-660 of FIG. 6, a new image 40, to be displayed to the viewer's right eye, is formed from images 32 and 33 by merging a left portion of image 32 with a left portion of image 33. Left image 41 is formed similarly by merging a right portion of image 32 with a right portion of image 31 to form a uniform image. New images 40 and 41 both cover the viewer's field of vision but obviously they are not identical, and are perceived as were taken from two viewpoints, thus giving the viewer a stereoscopic perception. Roughly, this new image pair is equivalent to a pair of images as if were taken by two virtual lenses having their optical axes directed forward in the viewer's viewing direction and having horizontal disparity.

The process illustrated in FIG. 7 is for a case where the viewer's field of vision overlaps three recorded images. However, it will be easily perceived that when the viewer's field of vision includes more recorded images (e.g., when it includes upper and lower parts of images from different latitudes or when each image covers only a small part of the viewer's field of vision), the stereoscopic pair is formed along the same lines, by merging together the appropriate parts from each of the recorded images and by removing redundant information. The same holds (when using the second configuration of cameras arrangement wherein the field of vision of each lens overlaps to a great extent the fields of view of all adjacent lenses and the lenses are optionally equally distributed on the spherical surface) for cases where the viewer's horizon is inclined with respect to ground (i.e., when the viewer eyes are not at the same height with respect to ground). For such cases, the selection of the recorded images is done by projecting the viewer's field of vision on the collection of recorded images and selecting those images that form with each other the closest angle to the inclining angle. Upon selecting the appropriate image, the stereoscopic pair is generated by following steps 640 to 680 of FIG. 6.

The stereoscopic image pair thus formed can be displayed on a flat screen such as a TV or a computer screen or by using a display device for virtual reality such as a virtual reality headset. When displayed on a flat screen, the images are displayed as a stereoscopic pair to be viewed by suitable spectacles in accordance with the standard color filtering method for stereoscopic viewing or by any other known in the art techniques for stereoscopic displaying: The part of the image being displayed changes according to the viewer viewpoint as explained above.

It will be appreciated by persons skilled in the art that the present invention is not limited to what has been particularly shown and described herein above. Rather the scope of the present invention is defined only by the claims that follow.

The invention claimed is:

1. A photographing system for capturing a full stereoscopic curved image, or a continuous part thereof, said system comprising:
   a three-dimensional array of cameras having lenses, wherein the lenses of all said cameras are situated on a curved surface, pointing out from common centers of said curved surface, wherein a collective field of vision captured by all of said lenses covers a whole visual area surrounding said photographing system, or a continuous part thereof, and wherein any point in said collective field of vision is captured by at least two of said lenses; and
   a markers system that forms a set of image-position markers in a portion of the full stereoscopic curved image, or the continuous part thereof;
   wherein the curved surface is a spherical surface;
   wherein said cameras are arranged in a specific configuration wherein a field of vision of any of said lenses is overlapped to a first extent by fields of vision of two lenses, one of which is adjacent on one side, and the other of which is adjacent on an opposite side of said lens with respect to a vertical axis, and to a second extent by the fields of vision of adjacent lenses lying above and below said lens with respect to a horizontal axis, wherein said second extent is less than said first extent, and wherein said collective field of vision comprises a collection of fully circular stereoscopic panoramic images wherein any point within each of said fully circular stereoscopic panoramic images is captured by at least two of said lenses.

2. A multi-lens camera apparatus for generating a full stereoscopic curved image, or a continuous part thereof, said apparatus comprising:
   a set of lenses which are situated on a curved surface pointing out from common centers of said curved surface, wherein a collective field of vision captured by all of said lenses covers a whole visual environment surrounding said camera apparatus, or a continuous part thereof, and any point in said collective field of vision is captured by at least two of said lenses;
   means for sensing and storing image information of images captured by each of said lenses; and
   marking means for forming a set of image-position markers in the images;
   wherein the curved surface is a spherical surface;
   wherein said lenses are arranged in a specific configuration wherein a field of vision of any of said lenses is overlapped to a first extent by fields of vision of two lenses, one of which is adjacent on one side, and the other of which is adjacent on an opposite side of said lens with respect to a vertical axis, and to a second extent by the fields of vision of adjacent lenses lying above and below said lens with respect to a horizontal axis, wherein said second extent is less than said first extent, and wherein said collective field of vision comprises a collection of fully circular stereoscopic panoramic images wherein any point within each of said fully circular stereoscopic panoramic images is captured by at least two of said lenses.

3. A process for capturing a full or partial stereoscopic curved image of a visual environment to be displayed to a viewer by means allowing for stereoscopic viewing, said process comprising:
   arranging a three-dimensional array of cameras wherein lenses of all said cameras are situated on a curved surface pointing out from common centers of said curved surface, wherein a collective field of vision captured by all of said lenses covers a whole visual environment surrounding said array of cameras, or a continuous part thereof, and wherein any point in said collective field of vision is captured by at least two of said lenses; and
   forming a set of image-position markers in a portion of the full or partial stereoscopic curved image;
   wherein the curved surface is a spherical surface;
   further comprising arranging said lenses in a specific configuration wherein a field of vision of any of said lenses is overlapped to a first extent by fields of vision of two lenses, one of which is adjacent on one side, and the other of which is adjacent on an opposite side of said lens with respect to a vertical axis, and to a second extent by the fields of vision of adjacent lenses lying above and below said lens with respect to a horizontal axis, wherein said second extent is less than said first extent, and wherein said collective field of vision comprises a collection of fully circular stereoscopic panoramic images wherein any point within each of said fully circular stereoscopic panoramic images is captured by at least two of said lenses.

* * * * *